United States Patent
Senbonmatsu et al.

(10) Patent No.: US 9,041,896 B2
(45) Date of Patent: May 26, 2015

(54) BISTABLE LIQUID CRYSTAL DEVICE

(75) Inventors: Shigeru Senbonmatsu, Chiba (JP); Shuhei Yamamoto, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 219 days.

(21) Appl. No.: 13/809,184

(22) PCT Filed: Jul. 7, 2011

(86) PCT No.: PCT/JP2011/065607
§ 371 (c)(1),
(2), (4) Date: Mar. 21, 2013

(87) PCT Pub. No.: WO2012/049894
PCT Pub. Date: Apr. 19, 2012

(65) Prior Publication Data
US 2013/0208223 A1    Aug. 15, 2013

(30) Foreign Application Priority Data
Oct. 15, 2010   (JP) .................... 2010-232907

(51) Int. Cl.
*C09K 19/02*  (2006.01)
*G02F 1/1337*  (2006.01)
*G02F 1/1333*  (2006.01)
*G02F 1/139*  (2006.01)

(52) U.S. Cl.
CPC ........ *G02F 1/1337* (2013.01); *G02F 1/133345* (2013.01); *G02F 1/1391* (2013.01)

(58) Field of Classification Search
CPC ....................................................... C09K 19/02
USPC ............................................................ 349/172
See application file for complete search history.

(56) References Cited

U.S. PATENT DOCUMENTS

2006/0284155 A1* 12/2006 Kawakami et al. ............. 257/1
2007/0172697 A1*  7/2007 Kawakami et al. .......... 428/690

FOREIGN PATENT DOCUMENTS

WO           97 17632           5/1997

* cited by examiner

*Primary Examiner* — Timothy L Rude
(74) *Attorney, Agent, or Firm* — Adams & Wilks

(57) ABSTRACT

In a conventional bistable liquid crystal device, switching characteristics fluctuate among panels and there is a problem in mass productivity. As an intermediate layer, an uneven film is inserted between a low anchoring layer and ITO. The uneven film has an average surface roughness of 2 nm or less, which is measured by an atomic force microscope. In this manner, the low anchoring layer is not affected by the surface shape of the ITO film which differs among panels, and the switching characteristics are stabilized.

3 Claims, 2 Drawing Sheets

| ITO film thickness | Presence/absence of uneven film | Average surface roughness | Maximum difference in height |
|---|---|---|---|
| | | Ra [nm] | P-V [nm] |
| 100nm | Absent | 1.626 | 16.630 |
| | Present | 1.806 | 16.959 |
| 150nm | Absent | 2.432 | 22.870 |
| | Present | 1.860 | 16.252 |
| 200nm | Absent | 3.298 | 30.140 |
| | Present | 1.844 | 18.307 |

Fig.3

| ITO thickness | Uneven film | VT100 | Stability 7days | | Remark |
|---|---|---|---|---|---|
| | | | 0° | 180° | |
| 100nm | Present | 17.0V | OK | OK | |
| 150nm | Present | 17.8V | OK | OK | |
| 250nm | Present | 16.7V | OK | OK | |
| 100nm | Present | 16.0V | OK | OK | |
| 150nm | Absent | NG | — | — | No switching |
| 250nm | Absent | NG | — | — | No switching |

BISTABLE LIQUID CRYSTAL DEVICE

TECHNICAL FIELD

The present invention relates to a bistable liquid crystal device which utilizes bistability of liquid crystal as an electro-optic effect.

BACKGROUND ART

In recent years, there has appeared another group of nematic liquid crystal displays, that is, a group of surface-breaking nematic displays (for example, International Paten WO97/17632). Those displays have bistability, and the orientation thereof remains indefinitely without consuming energy. Energy supply is necessary only to switch between two states. With use of such features, those displays are increasingly employed for applications that are usable for a long period of time without a power supply cable (such as electronic books and electronic shelf labels).

Manufacturing of displays of this type has difficulty mainly in the point that the surface anchoring needs to be broken. That is, reproducible low energy anchoring is necessary. The bistable nematic displays which use weak anchoring are manufactured by the following method as a typical example. That is, liquid crystal is arranged between two glass plates coated with a conductive layer made of indium tin oxide (ITO). One electrode includes a coating for obtaining high pretilt angle or strong azimuthal anchoring, and the other electrode includes a coating for obtaining low pretilt angle and weak azimuthal anchoring energy. Further, two polarizers are arranged on each side of the cell with appropriate orientations.

The principle of this "bistable" technology lies in the presence of two stable states, that is, a uniform state and a 180-degree twisted state, without, any need to apply an electric field. In the following description, the uniform state is referred to as a U-state (Uniform), and the 180-degree twisted state is referred to as a T-state (Twist). The two states of U and T correspond to minimum energy levels. The two states of U and T are balanced an the case of using nematic liquid crystal having positive dielectric anistropy, for example, pentylcyanobiphenyl (known as "5CE") doped with a chiral additive. This type of device is generally called a Binem device.

This display technology utilizes the fact that, by applying an electric field of a specific shape and intensity to pass from one state to the other state, it is possible to break the weak anchoring while maintaining the strong anchoring state as it is. When the electric field is applied perpendicularly to the cell, similarly to the "black" state in the TN technology, a homeotropic texture is induced, in which molecules close to the low anchoring energy surface are perpendicular to the low anchoring energy surface. This non-equilibrium texture is the transition state, which can be switched to any one of the two stable states. When the application of the electric field is stopped, the state changes to the one or the other stable state depending on whether the elastic coupling effect or the hydrodynamic coupling effect is stronger.

In order to facilitate the cell switching between the T-state and the U-state, the weak anchoring may have a small tilt angle (<1°). On the ether hand, the strong anchoring may be obtained by an alignment film which is generally used for TN liquid crystal or STN liquid crystal having a certain pretilt angle. When the strong anchoring is tilted in one direction and the weak anchoring is tilted in the same direction, a transition electric field induced anchoring breakage, which is called a first-order breakage, allows switching from the T-state to the U-state. Switching free, the U-state to the T-state is achieved by the above-mentioned hydrodynamic coupling.

Various means have already been proposed for anchoring liquid crystal materials. However, although there are means that can generate sufficiently strong anchoring, there are only very few means teat can ensure weak anchoring.

As means that can ensure weak anchoring, the following method of manufacturing a liquid crystal cell is proposed in Patent Literature 1.

The weak anchoring is achieved by the method involving the steps of: attaching, to a substrate, a polymer, copolymer, or terpolymer selected from polymers and copolymers each formed of a poly(vinyl chloride-co-vinyl alkyl ether) type polymer or copolymer, or a poly(vinyl chloride-co-vinyl aryl ether) type polymer or copolymer; stabilizing the coating of the above-mentioned polymer; and causing azimuthal alignment of the coating to induce controlled azimuthal anchoring of the liquid crystal.

According to Patent Literature 1, the coating is stabilized thermally and/or by exposure to ultraviolet, and the pretilt angle of the nematic liquid crystal is small ($0°<\Psi<1°$, preferably $0.1°<\Psi<0.5°$). As a result, it is possible to form a low energy anchoring layer in the bistable nematic liquid crystal cell.

CITATION LIST

Patent Literature

[PTL 1] JP 2004-163878 A (Page8, Chem 3)

SUMMARY OF INVENTION

Technical Problem

In the following, a voltage for change with a simple square wave (for example, pulse width of 2 msec) from 0° through the anchoring breakage state of the low anchoring layer to the T-state is defined as VT, and VT for switching all pixels (100% pixels) in the liquid crystal panel from, the U-state to the T-state is defined as VT100.

The Binem device (hereinafter referred to as liquid crystal panel) in Patent Literature 1 has a problem in that the VT100 characteristic is unstable in mass production. That is, there is a problem in that the VT100 characteristic fluctuates among liquid crystal panels.

The upper-limit value of the VT100 specification in mass production is determined based on the upper limit of the output voltage of the drive IC for driving the liquid crystal panel. Therefore, a liquid crystal panel in which VT100 exceeds a certain range cannot switch its entire area to the T-state, and hence is defective. As a result of various repetitive experiments and analyses for suppressing the fluctuations of VT100 in the liquid crystal panel, it has been found that the biggest factor of the fluctuations of VT100 is fluctuations of anchoring energy in the low anchoring layer, and the anchoring energy of the low anchoring layer is significantly shifted due to a surface shape of an ITO film.

Generally, as an electrode, indiumtinoxide (ITO) having a film thickness of 100 nm to 300 nm is used. When the ITO surface was observed with an atomic force microscope (AFM), although depending on the ITO film formation method and the ITO film thickness, for example, when the surface shape of the ITO sputtered to have a film thickness of 150 nm was observed with the AFM, in an area of 1 $\mu m^2$, the average surface roughness (hereinafter referred to as Ra) was approximately 2.3 to 2.8 nm, and the maximum difference in height (P-V) was 20 to 40 nm. Thus, there were fluctuations of Ra and P-V among ITO substrates (number of substrates measured by AFM=5). Even if the ITO film formation conditions (sputtering conditions) are set constant, it is impossible to always control the fine irregularities of the ITO surface to be constant. The fine difference in surface shape of the ITO affected the anchoring energy of the low anchoring layer formed directly on the ITO.

In short, the low anchoring layer formed on the ITO was 10 nm or less and thin, and hence the fine difference in surface shape among ITO substrates was non-negligible. The surface shape of the ITO was reflected on the surface shape of the low anchoring layer, which affected the pretilt angle of the liquid crystal and the weak anchoring energy. Fluctuations of the pretilt angle of the liquid crystal and the weak anchoring energy are directly linked with the fluctuations of VT100 in the liquid crystal panel. Therefore, there was a significant problem in the mass production stability.

Solution to Problem

In order to solve the above-mentioned problem, studies were made of inserting an intermediate layer between a low anchoring layer and ITO in the present invention. As a result, it was found that, as the intermediate layer, an uneven film was effective to be inserted. Various uneven films were studied, and as a result, through measurement with use of the atomic force microscope (hereinafter referred to as AFM), it was found that stable VT100 in the liquid crystal panel was obtained when the average surface roughness Ra was 2 nm or less. When the uneven film was formed on various ITOs whose film was observed with the AFM, Ra of the uneven film was substantially constant as well. Further, even when the thickness of the uneven film was changed in the range of 20 nm to 1,000 nm, a surface shape having a substantially constant Ra was observed.

In short, even when the surface shape of the ITO film was changed, and even when the thickness of the uneven film was changed, through measurement with use of the AFM, the average surface roughness Ra of the uneven film was substantially constant. As a result, by inserting the uneven film between the low anchoring layer and the ITO, the low anchoring energy was stabilized, with the result that it was possible to significantly reduce the fluctuations of VT100 in the liquid crystal panel.

The uneven film can be easily formed by mixing fine particles in the printable insulating film. In particular, in order to set Ra of the uneven film to the 2 nm or less, it is preferred to set the shape of the fine particles to 15 nm or less.

Advantageous Effects of Invention

According to the bistable liquid crystal device of the present invention, that is, by inserting the uneven film between the low anchoring layer and the ITO, the uneven film having an average surface roughness Ra of 2 nm or less through measurement of the AFM, it is possible to stably manufacture a Binem liquid crystal panel in mass production.

BRIEF DESCRIPTION OF DRAWINGS

FIG. 3 An explanatory diagram of switching characteristics of the bistable liquid crystal device according to the present invention.

DESCRIPTION OF EMBODIMENT

Figures 1, 2:
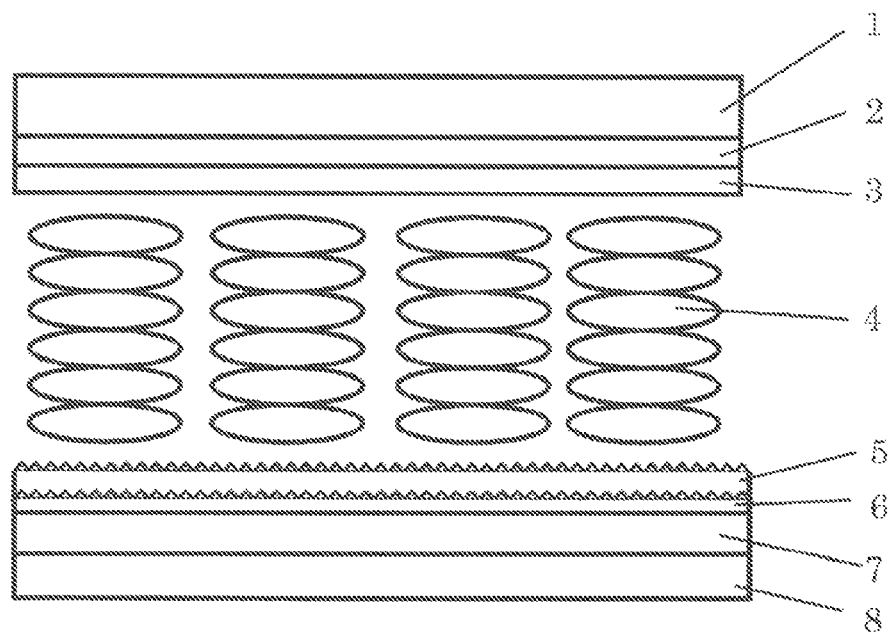
FIG. 1 A schematic explanatory view of a bistable liquid crystal device according to the present invention.
FIG. 2 A surface shape analysis with use of an AFM after an ITO surface and an uneven film are formed.

A bistable liquid crystal device according to the best mode of the present invention is described with reference to FIG. 1. FIG. 1 is a schematic sectional view of the bistable liquid crystal device according to the present invention. An ITO film 2 and a strong anchoring film 3 are formed on a substrate 1, and the strong anchoring film 3 is subjected to alignment processing by rubbing using a rotating cloth roller. On the other hand, an ITO film 7, an uneven film 6, and a weak anchoring film 5 are formed on a substrate 8, and the weak anchoring film 5 is subjected to alignment processing by rubbing using a rotating cloth roller. The uneven film 6 is formed by coating, by flexographic printing, a coating-type insulating film having polytitanoxiloxane as a main component with a material in which silica fine particles are mixed, and then curing the material. Liquid crystal 4 is sandwiched between the substrate 1 and the substrate 7 with a cell gap of about 1.5 μm.

By providing the uneven film 6 on the ITO 7, the low anchoring film can be stably formed, and regardless of the fine surface shape of ITO 7, a constant anchoring energy can be obtained. That is, a constant anchoring energy can be always obtained stably, and the fluctuations of VT100 in the liquid crystal panel are reduced.

In the following, the bistable liquid crystal device and a method of manufacturing the same according to the present invention are described in detail with reference to the drawings.

EXAMPLE 1

A bistable liquid crystal device according to Example 1 is described with reference to FIG. 1. FIG. 1 is a schematic sectional view of the bistable liquid crystal device according to the present invention. An ITO film 2 and a strong anchoring film 3 were formed on a glass substrate 1. The ITO film 2 of 250 nm was formed by sputtering, and the strong anchoring film was formed of a polyimide alignment film of 50 nm, which enabled the pretilt angle to be about 5°, by flexographic printing. The strong anchoring film 3 was subjected to alignment processing by rubbing using a rotating cloth roller. On the other hand, an ITO film 7, an uneven film 6, and a weak anchoring film 5 were formed on a glass substrate 8. Three types (film thicknesses: 100 nm, 150 nm, and 200 nm) of ITO films 7 were formed by sputtering, and the uneven film 6 of 50 nm was formed by flexographic printing. The three types of ITO films were intentionally prepared for evaluation of fluctuations of the ITO surface shapes.

As for the uneven film 6, there was used a coating-type material obtained by dissolving a solid content having polytitanosiloxane as a main component into a solvent having propylene glycol and butyl cellosolve as main components at a solid content concentration ratio of 6%, and further mixing silica particles of 10 to 15 nm at a solid content concentration ratio of 1%. The silica particles were use in this case, but transparent insulating metal oxide particles such as titanium oxide may be alternatively used. The particles such as titanium oxide may be alternatively used. The particles to be mixed are not limited to be inorganic as long as the particles are transparent insulators, and may be organic particles or organic-inorganic hybrid particles.

The uneven film 6 was subjected to flexographic printing and drying. Then, the uneven film 6 was subjected to VU irradiation and then main baking. Further, the weak anchoring film 5 was formed of a polymer having polyvinylchloride (PVC) as a main component by flexographic printing to have a film thickness of 10 nm or less (equal to or less than measurement limit by a step gauge). The weak anchoring film 5 was subjected to alignment processing by rubbing using a rotating cloth roller. Liquid crystal 4 was sandwiched between the glass substrate 1 and the glass substrate 7 with a cell gap of about 1.5 μm. As the liquid crystal 4, nematic liquid crystal described in Japanese Patent Application Laid-open No. 2008-285594 and produced by DIC Corporation was used.

FIG. 2 shows results of forming the uneven film 6 on the three types of ITO films 7 (film thicknesses; 100 nm, 150 nm, and 200 nm), and observing the surface shapes with the AFM. As shown in the measurement results of FIG. 2, by forming the uneven flirt 6, the surface shape of the uneven film 6 was substantially the same even when the film thickness of the ITO film 7 was different (the surface shape of the ITO film 7 was significantly different).

In the bistable liquid crystal device of Example 1, as shown in FIG. 3, when the uneven film 6 was formed, in ail cases of the ITO film thicknesses (100 nm, 150 nm, and 200 nm), switching from 0° to 180° (hereinafter referred to as T-switching) and switching from 180° to 0° (hereinafter referred to as U-switching) were confirmed. The liquid crystal panel having an ITO film thickness of 100 nm carried out T-switching with a square wave having a voltage of 17 v and a pulse width of 2 msec (VT100=17.0 v). In the liquid crystal panel having an ITO film thickness 150 nm, VT100=17.8 v was established, and in the liquid crystal panel having an ITO film thickness of 250 nm, VT100=16.7 v was established. Thus, VT fluctuations due to the ITO film thickness (surface shape) were significantly reduced. Further, bistability at each of 0° and 180° (stability of U and T) was observed for one week, but no problem was observed in all of the liquid crystal panels having the respective ITO film thicknesses.

On the other hand, under a state in which the uneven film 6 was not formed and the weak anchoring film 5 was directly formed on the ITO film 7 without forming the uneven film 6, T-switching and U-switching and stability between T-switching and U-switching were observed. As a result, as shown in FIG. 3, the liquid crystal panel having an ITO film thickness of 100 nm carried out T-switching with a square wave having a voltage of 17 v and a pulse width of 2 msec (VT100=16 v). The liquid crystal panel having an ITO film thickness of 100 nm and the liquid crystal panel having an ITO film thickness of 200 nm did not carry out U-switching.

As is apparent from FIGS. 2 and 3, by providing the uneven film 6, the effect to VT100 in the liquid crystal panel to be caused by the surface shape of the ITO film becomes ignorable, and the VT100 fluctuations to be caused by the fluctuations of the surface shape of the ITO film can be reduced.

INDUSTRIAL APPLICABILITY

According to the bistable liquid crystal device of the present invention, the mass productivity can be significantly improved (fluctuations of VT100 in the liquid crystal panel can be reduced), and hence an inexpensive bistable liquid crystal device can be stably supplied.

REFERENCE SIGNS LIST

1, 8 substrate
2, 7 ITO trim
3 strong anchoring film
4 liquid crystal
5 weak anchoring film
6 uneven film

The invention claimed is:

1. A bistable liquid crystal device, comprising:
   a pair of substrates each having an electrode and an alignment film formed thereon;
   liquid crystal sealed between the pair of substrates;
   a low anchoring energy alignment film provided on at least one of the pair of substrates; and
   an uneven film provided between the low anchoring energy alignment film and the electrode, the uneven file having an average surface roughness of 2 nm or less.

2. A bistable liquid crystal device according to claim 1, wherein the uneven film is made of a material in which fine particles are mixed.

3. A bistable liquid crystal device according to claim 2, wherein the fine particles have a particle diameter of 15 nm or less.

* * * * *